United States Patent [19]

Bergez et al.

[11] 4,053,662
[45] Oct. 11, 1977

[54] METHOD OF PROCESSING POROUS METAL FILTERS

[75] Inventors: Pierre Bergez, Asnieres; Roger Lacroix, Suresnes; Pierre Plurien, Palaiseau; Jean-Paul Touboul, Paris, all of France

[73] Assignee: Commissariat a l'Energie Atomique, Paris, France

[21] Appl. No.: 478,744

[22] Filed: June 7, 1974

[30] Foreign Application Priority Data

July 26, 1973 France .................................. 73.27357

[51] Int. Cl.$^2$ ....................... C23C 13/02; C23C 13/04
[52] U.S. Cl. ........................................ 427/250; 55/16; 55/158; 427/253; 427/383 D; 75/250; 428/539.5
[58] Field of Search .................... 55/16, 158; 29/182.1; 427/205, 250, 253

[56] References Cited

U.S. PATENT DOCUMENTS 3,748,105  7/1973  Reen et al. ........................... 29/182.1

Primary Examiner—Leland A. Sebastian
Attorney, Agent, or Firm—Cameron, Kerkam, Sutton, Stowell & Stowell

[57] ABSTRACT

A method of processing porous metal filters used for separating isotopes of uranium hexafluoride, so as to improve the mechanical strength and resistance to corrosion of the fiters.

The filters are placed in the presence of an aluminum-based cement in a closed heat-resistant and oxidation-resistant vessel, the interior of the vessel is disposed in a inert gas atmosphere and the vessel is heated to between 800° and 1,000° C in a furnace for about 1 hour.

The filters are used for separating uranium isotopes.

7 Claims, No Drawings

METHOD OF PROCESSING POROUS METAL FILTERS

The invention relates to a method of processing porous metal filters used for separating uranium isotopes, the object of the treatment being to protect the filters against corrosive agents and increase their mechanical strength while ensuring that they have sufficient permeability.

The invention relates more particularly to a method of diffusing aluminum inside porous metal filters.

The metal filters to which the method according to the invention is applied are porous members generally known as porous barriers and normally made of iron, nickel, cobalt or alloys thereof.

The corrosive substances which can act on the porous barriers are air and oxidizing gases up to 1,100° C. The gases come from the combustion of hydrocarbons and can contain sulphur compounds up to 1,100° C, or fluorine and derivatives thereof such as HF, ClF, and $UF_6$, up to 500° C.

There are known methods of diffusing aluminum in compact substances or members, including a method wherein the compact substances are disposed in a pulverulent mixture or cement containing powdered aluminum or an alloy thereof and also containing an inert powder such as alumina and a halogen compound, the assembly subsequently being raised to a temperature above 700° C in a neutral or reducing atmosphere.

The compact members are usually components of jet motors, gas turbines or valves of internal combustion engines. Some of these components have ducts for introducing water for cooling them in operation, but in no case are the substances porous.

In order to work the aforementioned method of diffusing aluminum in compact members, the member to be treated is usually placed in an inconel chamber provided with a cover bearing a thermocouple instrument for checking the temperature of the reaction. The member is disposed above or in a source of aluminum comprising a cement. The chamber and its contents are subsequently placed in a furnace in an atmosphere of hydrogen, nitrogen or argon or a mixture thereof.

The cement is made up of three constituents:
A "source" of aluminum, i.e., powdered aluminum or a powdered aluminum alloy,
An "activator," i.e., a halide which is volatile or which can be dissociated into volatile elements, and
An "excipient," i.e., an inert powder, e.g. crushed alumina.

The chamber is placed in a portion of the furnace which is at a uniform temperature and forms an isothermic thermodynamic system containing two solids having different compositions, i.e., the member or component to be processed and the source of aluminum.

The result is a disequilibrium. Equilibrium cannot be reached until the chemical potentials of the different elements have the same value everywhere, i.e., until the thermodynamic activity of the constituents of the salts and of the component are the same, both in the component and in the source.

In order to obtain kinetic equilibrium a transfer of matter must occur between the two solids separated from one another. The transfer is brought about by the activator, which can be an ammonium or alkali-metal halide. It forms a volatile compound with aluminum, so that metal can be transferred from the source to the components.

If, for example, the activator is ammonium chloride, the following reactions may occur:
1. Thermal dissociation of ammonium chloride $NH_4Cl \rightarrow NH_3 + HCl$
2. Action of hydrochloric acid on the aluminum in the source:
$2Al$ (solid) $+ 6HCl$ (gas) $\rightarrow 2AlCl_3$ (solid) $+ 3H_2$
3. In the presence of an excess of aluminum: $AlCl_3$ (solid) $+ 2Al \rightarrow 3AlCl$ (vapor)

AlCl is aluminum sub-chloride. The vapors are in equilibrium with the source, which is rich in aluminum, but are not in equilibrium with the surface of the component, which is depleted in aluminum, and the result is a reaction of the type:

$$AlCl + \tfrac{1}{2} H_2 + Ni \rightarrow Al \text{ (in solution in Ni)} + HCl$$

The HCl formed may further react with the source to form more AlCl sub-chloride. The transfer stops when the activity of the aluminum in the surface region of the source is the same as in the surface region of the component.

The surface compositions of the source and of the component vary in time, not only when the rate of extraction or deposition of aluminum, but also with the diffusion rate of aluminum towards the depleted surface of the source and from the enriched surface of the component towards the interior thereof.

The operation of hardening a component by using aluminum comprises three aluminum transfer phenomena, each of which occurs at a characteristic rate, the final rate being dependent on the slowest of the three processes. The three processes are as follows:

Transfer by diffusion via the source, from the interior to the surface, the rate thereof depending for example on the composition and particle size of the source and the quantity of elements present;

Transfer by diffusion in the gas phase of the aluminum halide vapor, depending for example on the vapor tension of the halide, the quantities capable of forming in accordance with the concentration of the activator and the chemical reaction rates, and the distance between the source and the component; and Transfer by diffusion from the surface to the interior of the component, the speed of diffusion depending more particularly on the composition, dimensions and porosity of the component.

All the transfer speeds or rates are closely dependent on temperature, mainly in accordance with the Arrhenium Law.

In addition to the aforementioned causes of complexity, there are others due to constituents other than aluminum of the source and of the component, which also may travel from the source to the component or from the component to the source. It can be seen therefore that, though the method of processing by diffusion of aluminum is known in principle, it is not clear a priori that it can be applied to substances of different natures, more particularly to porous substances, so as to give satisfactory results.

The invention relates to a method of processing porous metal filters used for separating isotopes of uranium hexafluoride, so as to improve the mechanical strength and resistance to corrosion of the filters, characterized in that the filters are placed in the presence of an aluminum-based cement in a closed heat-resistant and oxidation-resistant vessel, the interior of the vessel is disposed in an inert gas atmosphere and the vessel is heated to between 800° and 1,000° C in a furnace for about 1 hour.

The method applies more particularly to porous nickel tubes used as supports for microporous layers to form gas diffusion barriers used in separating uranium isotopes. Since uranium hexafluoride is the gas which is diffused, the supports must first of all be resistant to corrosion by this gas and by other gases, such as fluorine, chlorine trifluoride or hydrofluoric acid, which may temporarily or permanently accompany it. The supports must have other qualities, depending on their expected performance during the manufacture of barriers and on their use in a uranium-enrichment factory.

The barriers are manufactured under hydrostatic pressure which may reach or may even slightly exceed 2.5 Kbar. The support must not break or crack. It should retain a permeability of at least 40 000 C.E.A. units. Each C.E.A. unit is equal to 1 mol air/cm$^2$/minute/cm Hg.

The qualities of the microporous layer, including the absence of leaks formed by macropores, are closely dependent on the qualities of the bearing liner on which the layer is deposited, i.e., on the fineness and uniform roughness thereof, i.e., the absence of cavities or outcrops.

When used in an isotope separation factory, the support tubes must remain intact for up to 10 years.

Pure nickel supports have adequate resistance to corrosion but do not withstand hydrostatic compression of 2.15 kbar. They cave in and their permeability becomes less than 2,500 C.E.A. units. There is a method of hardening them by diffusion of phosphorus. Their compressive strength then becomes satisfactory but phosphuration treatment has certain disadvantages which can be avoided by treatment with aluminum.

In one method of manufacturing phosphorus-nickel support tubes, the raw material is powdered nickel which has undergone phosphuration treatment. The support tube has to be manufactured by a sintering operation which, if it is to be completed in a reasonable time under industrial conditions, must be performed at the highest possible temperature, i.e., above 800° C. Treatment at this temperature is not disadvantageous in the case of pure nickel, but the use of phosphorus-containing nickel introduces difficulties which can be anticipated by consulting the NiP binary diagram. As can be seen, the solubility of phosphorus in nickel is very low. It reaches a maximum of 0.32% at 875° C. Above 0.32% — and for even lower concentrations below 875° C — the compound Ni$_3$P forms. Ni$_3$P and the excess nickel form a eutectic mixture which melts at 875° C and contains 11% by weight of phosphorus and 89% nickel. In other words, at 875° C 1% of phosphorus forms a quantity of liquid equal to almost 10% of the mass of phosphorus-containing nickel in which the liquid is produced. Between 0.8 and 1.2% phosphorus has to be used in order adequately to harden the nickel. Furthermore, the liquid phase formed during the sintering of the support tubes produces cavities and droplets therein, which solidfy into round, projecting particles at the surface of the tubes. In order to avoid this danger (resulting in defects in the barriers) and perform sintering in a reasonable time, the operating temperatures must be adjusted very accurately, both in time and over the entire length of the sintering furnace. This involves the use of expensive apparatus and continuous supervision.

The method according to the invention does not have the aforementioned disadvantages, but has the following advantages:

The nickel tubes processed with aluminum have already been sintered, at least partly.

The solubility of aluminum in nickel is considerable — approximately 5% by weight at ambient temperature. It reaches a maximum of approximately 12% at 1,360° C. The eutectic liable to form in nickel-rich alloys becomes liquid only at a very high temperature, 1,360° C;

NiAl alloys rich in nickel are exceptionally resistant to corrosion.

When increasing quantities of aluminum are alloyed to the nickel, the alloys become progressively harder up to the compound NiAl, which contains 68.5% nickel. The fragility increases simultaneously and is probably due to the intermetallic compounds Ni$_3$Al and NiAl which are formed. It has been found that these phases should not be allowed to occur in appreciable quantities in the support tubes, in order to prevent them from becoming excessively brittle and breaking during compression. The total aluminum content in the support tubes should not exceed 10% by weight.

Usually, the fixed or alloyed aluminum is not uniformly distributed in the nickel. Since aluminum diffuses from the surface, the surface is richer in aluminum than the deeper portions. Usually, the diffusion affects only a fraction of the thickness of the nickel. Consequently, the aforementioned content of 10% may be locally exceeded in diffused layers. In this case there are a number of layers, and the top layers are richest in aluminum and may contain the phase Ni$_3$Al + NiAl or even NiAl. Even in the last-mentioned case, the support remains sufficiently rigid if the thickness of the top layers is less than 5 microns, or preferably less than 2 microns.

It has been found that the aluminum diffusion treatment results in a reduction in the permeability of the support tubes. This is probably due to a decrease in the wall volume of the pores which fix the aluminum, and to an activated sintering effect. In order, therefore, to obtain a given permeability, the tubes initially used must have an appreciably higher permeability than the desired value. Consequently, the porous nickel tubes undergo two reductions in permeability, one produced by aluminum diffusion treatment and the other by compression. It is noteworthy that the sum of these two reductions is substantailly constant, so that the method is very flexible. This is shown by the following examples, which in no way limit the scope of the invention.

EXAMPLES

The cement had the following composition:

| | |
|---|---|
| Aluminum-nickel alloy containing 70% by weight of nickel | 49 parts |
| Ammonium chloride | 2 parts |
| Alumina | 49 parts |

The Al-Ni alloy was obtained by fusion and then cast in bars, which were broken up and crushed, after which the powder obtained was screened.

The alumina was electro-melted, made up of particles of non-porous alumina α.

The three constituents were carefully mixed. The nickel tubes were disposed vertically in an inconel chamber, which was filled with cement. The interior of the tubes was also filled with cement.

After the cover has been adjusted, the chamber was placed in a furnace in an argon atmosphere. The processing temperature was reached in 2 hours. Cooling took 3 hours.

Tables I gives the results of the various experiments.

Table II shows the changes in permeability after each operation, and

Table III shows the variations in the mechanical characteristics of the nickel tubes, in dependence on the increasing contents of aluminum. The Tables show the following:

The crushing strength in kg of different samples containing increasing proportions of aluminum. The sample at 0% was the porous nickel tube, which was used as the control sample in all the processes.

The crushing strength was measured on a portion of the tube 4 cm long, 0.4 mm thick and 15 mm in diameter. The Young modulus in hectobars was measured on cylindrical tubes having the same diameter and the same thickness. The measurement was made by shell resonance.

By way of comparison, a sample having the same shape and made of nickel containing 0.75% of phosphorus, had the following values for the same characteristics:

Crushing strenght: 13 – 13.5 kg
E T = 7400 – 7800

The process of hardening a porous nickel tube by diffusion of phosphorus an NiP alloy whose melting point decreases rapidly with the phosphorus content. Consequently, at the normal phosphorus contents of 0.75%, it is difficult to weld a phosphorus-nickel tube to a pure nickel spigot, since the NiP melts before the nickel, resulting in capillary diffusion of the molten phase into the porous region, accompanied by splitting and cracking.

The difficulty does not occur in the case when a pure nickel spigot is welded to a porous tube hardened by aluminum diffusion.

TABLE II

Variations in the permeability of the porous nickel tubes in Table I

| Examples | Variations in permeability in C.E.A. units $10^{-7}$ mol air/cm$^2$/min/cm Hg | | |
|---|---|---|---|
| | After processing | After compression | Total |
| 1 | 117 200 | 1 800 | 119 000 |
| 2 | 116 000 | 1 000 | 117 000 |
| 3 | 47 000 | 72 000 | 119 000 |
| 4 | 47 000 | 71 700 | 118 700 |
| 5 | 51 000 | 61 500 | 112 500 |

TABLE III

| % Aluminium | Crushing (Strength) | Tangential Young's Modulus |
|---|---|---|
| 0 | 4.5 | 3360 |
| 5 | 6.5 | 3900 |
| 6.2 | 11.5 | 6284 |
| 7.4 | 12.5 | — |
| 8.4 | 13.5 | — |
| 9.4 | 14.1 | 7386 |
| 10 | 14.3 | 7571 |

We claim:
1. A method of processing porous metal filters used for separating isotopes of uranium hexafluoride, so as to improve the mechanical strength and resistance to corrosion of the filters, characterized in that the filters are placed in the presence of an aluminum-based cement in a closed heat-resistant and oxidation-resistant vessel, the interior of the vessel is disposed in an inert gas atmosphere and the vessel is heated to between 800° and 1000° C in a furnace for about 1 hour.

2. A method of processing according to claim 1, characterized in that the cement is a powder containing aluminum or an alloy thereof, a halide which is volatile or can be dissociated into volatile elements, and an inert alumina.

3. A method according to claim 2, characterized in that the cement contains 49 parts by weight of an aluminum alloy containing 70 parts by weight of nickel, 2 parts by weight of aluminum chloride and 49 parts of alumina.

4. A method according to claim 3, characterized in that electro-melted alumina is used.

5. A method according to claim 3, characterized in that particles of non-porous α alumina are used.

6. A method according to claim 1, characterized in that the processed filters have a total aluminum content of less than 10% by weight.

7. A method according to claim 1, characterized in that the porous metal filters are porous nickel tubes.

* * * * *

TABLE I

Processing of porous nickel tubes by diffusion of aluminium

| | Processing conditions | | Permeability in C.E.A. units $10^{-7}$ mol air/cm$^2$/ min/cm Hg | | |
|---|---|---|---|---|---|
| Examples | Temperature in ° C | Duration in h or min | Untreated tubes | After treatment | After treatment and compression at 2.15 kbar |
| 1 | 950 | 1 h | 170 500 | 53 300 | 51 500 |
| 2 | 850 | 1 h | 164 000 | 48 000 | 47 000 |
| 3 | 850–890 | 45 min | 150 000 | 103 000 | 31 000 |
| 4 | 850 | 50 min | 157 900 | 110 900 | 39 200 |
| 5 | 850 | 53 min | 153 000 | 102 000 | 40 500 |